US010306459B1

(12) United States Patent
Patil et al.

(10) Patent No.: US 10,306,459 B1
(45) Date of Patent: May 28, 2019

(54) METHODS, SYSTEMS, AND COMPUTER READABLE MEDIA FOR VALIDATING A VISITOR LOCATION REGISTER (VLR) USING A SIGNALING SYSTEM NO. 7 (SS7) SIGNAL TRANSFER POINT (STP)

(71) Applicant: Oracle International Corporation, Redwood Shores, CA (US)

(72) Inventors: Ravindra Madhukar Patil, Bangalore (IN); Vipin Kumar, Bangalore (IN); Shashikiran Bhalachandra Mahalank, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/035,008

(22) Filed: Jul. 13, 2018

(51) Int. Cl.
*H04W 64/00* (2009.01)
*H04W 8/06* (2009.01)
*H04W 8/12* (2009.01)

(52) U.S. Cl.
CPC ............... *H04W 8/06* (2013.01); *H04W 8/12* (2013.01)

(58) Field of Classification Search
CPC ......... H04W 4/00; H04W 4/02; H04W 4/029; H04W 4/16; H04W 4/50; H04W 8/04; H04W 8/12; H04W 8/06; H04W 88/14; H04W 12/06; H04W 12/08; H04W 60/00; H04W 60/005; H04W 60/02
See application file for complete search history.

(56) References Cited

U.S. PATENT DOCUMENTS 7,043,754 B2 5/2006 Arnouse
8,045,956 B2 10/2011 Sun et al.
8,615,217 B2 12/2013 Ravishankar et al.
(Continued)

FOREIGN PATENT DOCUMENTS

EP 1 067 492 A2 10/2001
WO WO 2019/005287 A1 1/2019
WO WO 2019/027813 A1 2/2019

OTHER PUBLICATIONS

Notice of Allowance and Fee(s) Due and Applicant-Initiated Interview Summary for U.S. Appl. No. 15/408,155 (dated Oct. 31, 2018)
(Continued)

*Primary Examiner* — Jean A Gelin
(74) *Attorney, Agent, or Firm* — Jenkins, Wilson, Taylor & Hunt, P.A.

(57) ABSTRACT

A method includes maintaining a VLR validation database accessible by an SS7 STP and receiving, by the STP, a MAP SAI request message. The method also includes determining that the MAP SAI request message includes a VLR identifier not recorded in the VLR validation database accessible by the STP and recording the VLR identifier in the VLR validation database. The method further includes receiving a first MAP LU request message and detecting a VLR identifier in the first MAP LU request message and determining that the VLR identifier read from the first MAP LU request message does not match the VLR identifier recorded for a subscriber in the VLR validation database. In response to determining that the VLR identifier does not match the VLR identifier recorded for the subscriber in the VLR validation database, the first MAP LU request message is rejected.

20 Claims, 7 Drawing Sheets

(56) References Cited

U.S. PATENT DOCUMENTS

| | | | |
|---|---|---|---|
| 8,879,431 | B2 | 11/2014 | Ridel et al. |
| 9,060,263 | B1 | 6/2015 | Carames et al. |
| 9,191,803 | B2 | 11/2015 | Patel et al. |
| 9,240,946 | B2 | 1/2016 | Cai et al. |
| 9,374,840 | B2 | 6/2016 | Monedero Recuero |
| 9,538,335 | B1 | 1/2017 | Bank et al. |
| 9,628,994 | B1 | 4/2017 | Gunyel et al. |
| 10,021,738 | B1* | 7/2018 | Mehta .................. H04W 92/02 |
| 10,212,538 | B2 | 2/2019 | Russell |
| 2003/0087647 | A1 | 5/2003 | Hurst |
| 2004/0140908 | A1 | 7/2004 | Gladwin et al. |
| 2006/0068762 | A1* | 3/2006 | Baldwin ................ H04W 4/12 455/412.1 |
| 2007/0174082 | A1 | 7/2007 | Singh |
| 2008/0125116 | A1* | 5/2008 | Jiang ...................... H04W 8/06 455/433 |
| 2008/0207181 | A1* | 8/2008 | Jiang ...................... H04W 4/14 455/414.1 |
| 2008/0222038 | A1 | 9/2008 | Eden |
| 2009/0045251 | A1 | 2/2009 | Jaiswal et al. |
| 2009/0195349 | A1 | 8/2009 | Frader-Thompson et al. |
| 2010/0062789 | A1 | 3/2010 | Agarwal et al. |
| 2010/0100958 | A1 | 4/2010 | Jeremiah |
| 2010/0105355 | A1* | 4/2010 | Nooren .................. H04L 63/20 455/410 |
| 2010/0240361 | A1* | 9/2010 | Jiang ...................... H04W 8/06 455/426.1 |
| 2011/0014939 | A1* | 1/2011 | Ravishankar ......... H04W 12/12 455/515 |
| 2011/0029655 | A1 | 2/2011 | Forbes, Jr. et al. |
| 2011/0063126 | A1 | 3/2011 | Kennedy et al. |
| 2011/0124317 | A1 | 5/2011 | Joo |
| 2011/0173122 | A1 | 7/2011 | Singhal |
| 2011/0191835 | A1 | 8/2011 | Hawkes et al. |
| 2011/0225091 | A1 | 9/2011 | Plastina et al. |
| 2011/0307381 | A1 | 12/2011 | Kim et al. |
| 2012/0099715 | A1 | 4/2012 | Ravishankar et al. |
| 2012/0131121 | A1 | 5/2012 | Snyder et al. |
| 2012/0203663 | A1 | 8/2012 | Sinclair et al. |
| 2014/0199961 | A1 | 7/2014 | Mohammed et al. |
| 2014/0280645 | A1 | 9/2014 | Shuman et al. |
| 2015/0012415 | A1 | 1/2015 | Livne et al. |
| 2015/0188979 | A1 | 7/2015 | Almeras et al. |
| 2016/0088461 | A1 | 3/2016 | Jiang |
| 2016/0156647 | A1 | 6/2016 | Engel et al. |
| 2016/0165432 | A1* | 6/2016 | Dubesset .............. H04W 76/12 455/433 |
| 2016/0269566 | A1 | 9/2016 | Gundamaraju et al. |
| 2016/0292687 | A1 | 10/2016 | Kruglick |
| 2017/0345006 | A1 | 11/2017 | Kohli |
| 2018/0020324 | A1 | 1/2018 | Beauford |
| 2018/0109953 | A1 | 4/2018 | He |
| 2018/0167906 | A1* | 6/2018 | Chellamani ........... H04W 4/029 |
| 2018/0205698 | A1 | 7/2018 | Gupta et al. |
| 2018/0310162 | A1* | 10/2018 | Kim ........................ H04W 8/04 |
| 2019/0007788 | A1* | 1/2019 | Russell .................. H04W 4/02 |
| 2019/0044932 | A1 | 2/2019 | Kumar et al. |

OTHER PUBLICATIONS

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

Notification of Transmittal of the International Search Report and the Written Opinion of the International Searching Authority, or the Declaration for International Application No. PCT/US2018/030319 (dated Aug. 20, 2018).

Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).

"Draft LS on network verification of the UE provided location," 3GPP TSG SA WG2 Meeting #81, pp. 1 (Oct. 11-15, 2010).

Final Office Action for U.S. Appl. No. 15/408,155 (dated Jul. 26, 2018).

Commonly-assigned, co-pending U.S. Appl. No. 16/024,422 for "Methods, Systems, and Computer Readable Media for Network Node Validation," (Unpublished, filed Jun. 29, 2018).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

Examiner's Answer for U.S. Appl. No. 13/047,287 (dated Feb. 26, 2018).

Advisory Action Before the Filing of an Appeal Brief and AFCP 2.0 Decision for the U.S. Appl. No. 15/376,631 (dated Feb. 2, 2018).

Non-Final Office Action for U.S. Appl. No. 15/408,155 (dated Jan. 9, 2018).

Final Office Action for U.S. Appl. No. 15/376,631 (dated Nov. 28, 2017).

Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).

Commonly-assigned, co-pending U.S. Appl. No. 15/636,118 for "Methods, Systems, and Computer Readable Media for Validating User Equipment (UE) Location," (Unpublished, filed Jun. 28, 2017).

Non-Final Office Action for U.S. Appl. No. 15/376,631 (dated Jun. 16, 2017).

"LTE International Roaming Whitepaper," http://carrier.huawei.com/en/technical-topics/core-network/lte-roaming-whitepaper, pp. 1-16 (Downloaded May 12, 2017).

"Digital cellular telecommunications system (Phase 2+) (GSM); Universal Mobile Telecommunications Sytem (UMTS); Universal Geographical Area Description (GAD) (3GPP TS 23.032 V 14.0.0 Release 14)," ETSI TS 123 032 V14.0.0, pp. 1-30 (May 2017).

Final Office Action for U.S. Appl. No. 13/047,287 (dated Mar. 10, 2017).

"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).

Commonly-assigned, co-pending U.S. Appl. No. 15/408,155 for "Methods, Systems, and Computer Readable Media for Validating a Redirect Address in a Diameter Message," (Unpublished, filed Jan. 17, 2017).

"Digital cellular telecommunications system (Phase 2+) (GSM); Universal Mobile Telecommunications System (UMST); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).

"Edge Router (DEA)," http://www.mavenir.com/our-products/mobile/edge-router-dea, pp. 1-7 (Copyright 2017).

Commonly-assigned, co-pending U.S. Appl. No. 15/376,631 for "Methods, Systems, and Computer Readable Media for Validating Subscriber Location Information," (Unpublished, filed Dec. 12, 2016).

Non-Final Office Action for U.S. Appl. No. 13/047,287 (dated Aug. 25, 2016).

"Digital cellular telecommunications system (Phase 2+); Universal Mobile Telecommuncations System (UMTS); Numbering, addressing and identification (3GPP TS 23.003 V 12.9.0 Release 12)," ETSI TS 1 23 003 V12.9.0, pp. 1-93 (Mar. 2016).

"Syniverse Guide to LTE Roaming and Interoperability," http://www.syniverse.com/assets/files/custom_content/lte-roaming-interoperability-guide.pdf, pp. 1-11 (Jan. 8, 2016).

(56) References Cited

OTHER PUBLICATIONS

"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signalling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digital cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, V9.6.0, pp. 1-27 (Apr. 2015).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Services description; Stage1 (3GPP TS 22.071 V 11.0.0 Release 11)," ETSI TS 122 071 V11.0.0, pp. 1-50 (Oct. 2012).
Restriction and/or Election Requirement for U.S. Appl. No. 12/823,559 (dated Aug. 27, 2012).
Non-Final Office Action for U.S. Appl. No. 13/047,287 (dated Jun. 6, 2012).

"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"NET-NET Diameter Director," http://www.oracle.com/us/industries/communications/net-net-diameter-director-ds-1985034.pdf, pp. 1-9 (Copyright 2012).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Commonly-assigned, co-pending U.S. Appl. No. 13/047,287 (Unpublished, filed Mar. 14, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"Digital cellular telecommunications system (Phase 2+); Universal Mobile Telecommuncations System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Hakala et al., "Diameter Credit-Control Application," RFC 4006, pp. 1-115 (Aug. 2005).
Advisory Action Before the Filing of an Appeal Brief and AFCP 2.0 Decision for U.S. Appl. No. 15/376,631 (Dec. 19, 2018).

* cited by examiner

METHODS, SYSTEMS, AND COMPUTER READABLE MEDIA FOR VALIDATING A VISITOR LOCATION REGISTER (VLR) USING A SIGNALING SYSTEM NO. 7 (SS7) SIGNAL TRANSFER POINT (STP)

TECHNICAL FIELD

The subject matter described herein relates to enhancing telecommunications network security. More particularly, the subject matter described herein relates to methods, systems, and computer readable media for validating a VLR using a SS7 signal transfer point.

BACKGROUND

Telecommunications signaling networks, like most computer networks, have certain attack vulnerabilities. For example, in a mobile communications network, if a spoofer (i.e., a spoofing or masquerading entity) gains access to subscriber information maintained by a home location register (HLR), the spoofer can use the information to eavesdrop on text messages and voice conversations involving the subscriber. Accordingly, it is desirable to protect subscriber information maintained by an HLR.

Protecting subscriber information maintained by an HLR can be difficult because subscriber information is transmitted over the network in response to location update procedures and there is no authentication or verification of the initiator of such procedures. For example, when a subscriber's user equipment (UE) attaches to a network, the attachment point (e.g., the mobile switching center/visitor location register (MSC/VLR)) in SS7 networks sends messaging to the HLR to update the location of the UE with the HLR. The HLR responds with subscription information concerning the subscriber. It is the subscription information that could possibly be used by a spoofer to eavesdrop or otherwise affect communications to and from the UE.

If a spoofer masquerades as a valid network element serving the UE but is instead acting as an interception point for subscription information, the spoofer can use the location update procedure to obtain the subscription information. For example, the spoofer can send a fake location update (LU) message to the HLR in the home network of the subscriber. The HLR may respond to the spoofer with subscription information for the subscriber as if the spoofer is the valid MSC/VLR where the UE is currently registered. The subscription information is transmitted to the spoofer in a location update response message. Once the spoofer has the subscription information, the spoofer can eavesdrop on communications involving the subscriber and/or conduct other fraudulent activities.

Accordingly, there exists a need for methods, systems, and computer readable media for validating a VLR using a SS7 signal transfer point.

SUMMARY

Methods, systems, and computer readable media for validating a VLR using a SS7 signal transfer point are disclosed. One method for validating a VLR using a SS7 signal transfer point includes maintaining a visitor location register validation database accessible by a SS7 signal transfer point (STP) and receiving, by the STP, a mobile application part (MAP) send authentication information (SAI) request message. The method further includes determining, by the STP, that the MAP SAI request message includes a VLR identifier not recorded in the VLR validation database accessible by the STP and recording the VLR identifier in the VLR validation database accessible by the STP. The method also includes receiving, at the STP, a first MAP location update (LU) request message and detecting a VLR identifier in the first MAP LU request message and determining that the VLR identifier read from the first MAP LU request message does not match the VLR identifier recorded for a subscriber in the VLR validation database accessible by the STP. The method further includes in response to determining that the VLR identifier does not match the VLR identifier recorded for the subscriber in the VLR validation database accessible by the STP, rejecting the first MAP LU request message.

According to one aspect of the subject matter described herein, the VLR validation database is also accessible by a second SS7 STP that functions as a mate to the SS7 STP.

According to one aspect of the subject matter described herein, receiving the MAP SAI request message includes receiving the MAP SAI request message with an international mobile subscriber identity (IMSI) that is not recorded in the VLR validation database accessible by the STP and wherein recording the VLR identifier from the SAI request message in the VLR validation database accessible by the STP includes creating a new record in the VLR validation database accessible by the STP for the IMSI and the VLR identifier.

According to one aspect of the subject matter described herein, receiving a MAP SAI request message includes receiving a MAP SAI request message including an international mobile subscriber identity (IMSI) that is recorded in the VLR validation database accessible by the STP and wherein recording the VLR identifier from the SAI request message in the VLR validation database accessible by the STP includes creating, in the VLR validation database accessible by the STP, a record corresponding to the IMSI and storing the VLR identifier from the MAP SAI request message in the record.

According to one aspect of the subject matter described herein, the method further includes forwarding the SAI request message to a home location register (HLR), receiving a SAI acknowledgement message with a successful result code from the HLR, and starting a record expiry timer in response to receiving the SAI acknowledgement message from the HLR.

According to one aspect of the subject matter described herein, in response to the record expiry timer reaching an expiration value, the record is deleted from the VLR validation database accessible by the STP.

According to one aspect of the subject matter described herein, the method includes receiving a second MAP LU request message including a VLR identifier that matches the VLR identifier recorded for the subscriber in the VLR validation database.

According to one aspect of the subject matter described herein, the method includes forwarding the second MAP LU request message to a home location register.

According to one aspect of the subject matter described herein, the method includes updating a record entry in the VLR validation database accessible by the STP to indicate receipt of the second MAP LU request message and storing, in the record, a calling party address (CgPA) parameter from the second MAP LU request message as a VLR identifier.

According to one aspect of the subject matter described herein, the method comprises, in response to determining that the VLR identifier in the first LU request message does not match the VLR identifier recorded for the subscriber in the VLR validation database, designating the first LU request message as suspicious.

According to yet another aspect of the subject matter described herein, a system for validating a VLR using a SS7 signal transfer point is disclosed. The system comprises a SS7 signal transfer point (STP) that includes at least one processor and a visitor location register (VLR) validation database local to the STP for storing records for authenticating a plurality of VLRs. The system further includes a validation engine that is local to the STP and is implemented using the at least one processor for receiving a mobile application part (MAP) send authentication information (SAI) request message, determining that the MAP SAI request message includes a VLR identifier not recorded, recording the VLR identifier in the VLR validation database accessible by the STP, receiving a first MAP location update (LU) request message and detecting a VLR identifier in the first MAP LU request message. The validation engine is also configured for determining that the VLR identifier read from the first MAP LU request message does not match the VLR identifier recorded for a subscriber in the VLR validation database accessible by the STP, and, in response to determining that the VLR identifier does not match the VLR identifier recorded for the subscriber in the VLR validation database accessible by the STP, rejecting the first MAP LU request message.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
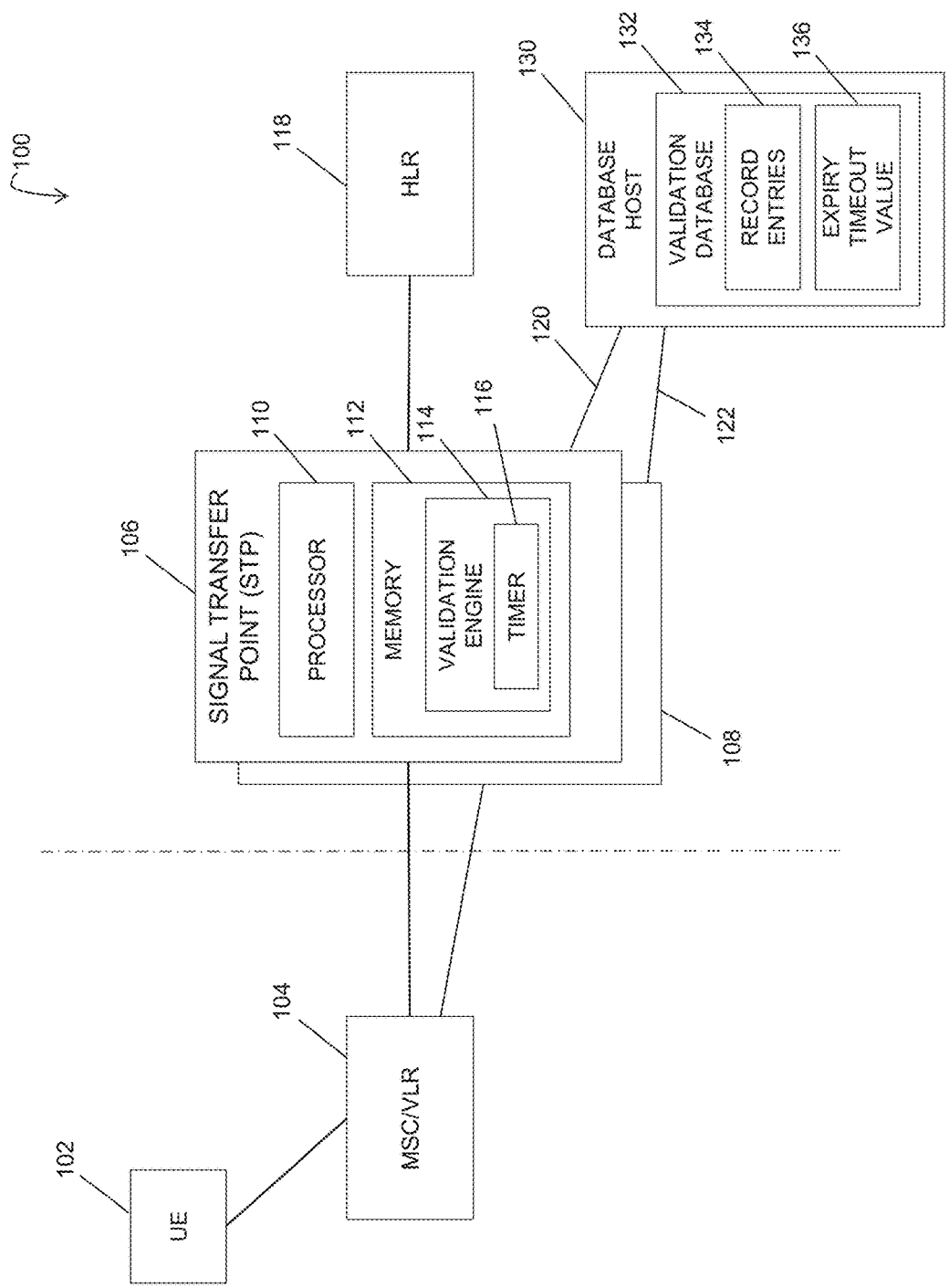
FIG. 1 is a block network diagram illustrating a system for validating a VLR using a SS7 signal transfer point.

The subject matter described herein relates to methods, systems, and non-transitory computer readable media for validating a VLR using a SS7 signal transfer point. FIG. 1 is a block diagram illustrating an exemplary communications network 100 that is configured to facilitate the communication of SS7 signaling messages among its network nodes. For example, network 100 includes a user equipment (UE) 102, a visited location register (VLR) 104, mated pair STPs 106 and 108, a database host 130, and a home location register (HLR) 118. User equipment 102 may include any device that is used directly by a subscriber end-user to receive or transmit data, such as a hand-held cellular telephone, a GSM mobile station, a laptop computer equipped with a mobile broadband adapter, or any other like device. In some embodiments, user equipment 102 is roaming in a visited network and is communicatively connected (e.g. attached) to MSC/VLR 104. For example, user equipment 102 can utilize a radio interface to establish a wireless connection with a base station Node B or eNodeB (not shown), which in turn is connected to MSC/VLR 104 (hereinafter referred to "VLR 104"). In some embodiments, VLR 104 serves as a local subscription database for an MSC positioned in a visited network (which is defined as the network where a subscriber's user equipment 102 is roaming in). Similarly, HLR 118 is a master subscription database that is located in the subscriber user's home network and that maintains records of user equipment devices that are registered to the home network.

Each of STPs 106 and 108 may include a router device or element that is configured to relay SS7 messages between signaling end-points (SEPs) and other signaling transfer points (STPs) (not shown). In some embodiments, SEPs include service switching points (SSPs) and service control points (SCPs). Although not shown, each of STP 106 and STP 108 may be connected to adjacent SEPs and STPs via signaling links. Based on the address fields of SS7 messages received by an STP, the STP routes the SS7 messages to an appropriate outgoing signaling link. As shown in FIG. 1, STP 106 and STP 108 may be deployed as a mated pair for reliability purposes. While mated pair STPs do not necessarily share information with each other, the STPs may be linked. For example, STP 106 and STP 108 may be linked together (not shown) via cross links (i.e., "C" links). These links are particularly important since the message path for received SS7 request messages (e.g., MAP SAI request messages and MAP location update request messages) can traverse different STP nodes belonging to a mated pair. For example, STP 106 may receive a SAI request message and STP 108 may receive a subsequent location update request message. As used herein, the term "location update (LU) request message" refers to a signaling message for updating a location of a mobile subscriber in a telecommunications network. "Location update request message" is intended to include SS7 mobile application part (MAP) location update request messages or any other message for updating the location of a telecommunications network subscriber with the network. Notably, the location update request message includes an identifier, such as an IMSI, MSISDN, and/or IMEI identifying the user equipment. The location update message may include an Interim Standard-41 (IS-41) message carried in a mobile application part (MAP) of an SS7 message that also contains an identifier of the MSC/VLR serving the subscriber as well as the SS7 point code of the MSC/VLR.

Since different STPs of a mated STP pair can provide different message paths, validating and/or correlating related SS7 request messages can be problematic in an SS7 network architecture. More specifically, MAP SAI request messages and related MAP location update request messages that are received by different STPs of a mated pair cannot always be correlated with each other. As such, network 100 has been configured to employ the use of a shared validation database 132 that is accessible by both STPs of the mated pair (e.g., primary STP 106 and secondary STP 108). In some embodiments, shared validation database 132 may reside in a database host 130 that can be accessed by, but is separate and distinct from, both STP 106 and STP 108. In other embodiments, validation database 132 may reside locally on one STP (e.g., STP 106) but may be accessed by the other STP of the mated pair (e.g., STP 108). In some embodiments, the signaling links (e.g., link 120 and link 122) existing between each of the STPs and database host 130 may comprise a "C" link. Each of STP 106 and STP 108 may include a record expiry timer 116 that can be implemented using a hardware and/or software based clock mechanism. As will be explained in detailed below, record expiry timer 116 may be initiated by validation engine 114 upon the receipt of an SAI acknowledgement message from an HLR 118. Validation engine 114 can utilize record expiry timer 116 and an expiry timeout period value 136 obtained from database host 130 to monitor the amount of time that expires between the receiving of the SAI acknowledgement message and a subsequent location update request message from a VLR.

As shown in FIG. 1, database host 130 may include a network element (e.g., application server) that is responsible for hosting and maintaining a VLR validation database 132 that is accessible to the mated STP pair. Notably, database host 130 is communicatively connected to each of STP 106 and STP 108 via cross links 120-122, which respectively provides access to shared validation database 132. In some embodiments, validation database 132 includes a plurality of database record entries 134 corresponding to a plurality of visited network VLRs. Specifically, each database record entry 134 may comprise an IMSI and a validation tuple associated with a particular VLR. For example, the validation tuple portion of the database record entry may contain visited VLR identification information, an SAI request flag, and a location update request flag (e.g., <VLR-ID, SAI-Flag, LU-Flag>). In some embodiments, the VLR identifier may be extracted by validation engine 114 from the VLR address contained in an ingress SAI request message. Further, the SAI-Flag may be set to "1" to serve as an indication that the SAI request message was received from a VLR in a visited network. Similarly, the LU-Flag can be set to "0" to indicate that the location update request message has not yet been received from the visited network. The LU-Flag can otherwise be set to "1" after the location update request message is received from the same VLR that originally sent the SAI request message.

In some embodiments, validation database 132 may also be configured to store an expiry timeout period value 136, which is accessible and/or read by validation engine 114. In particular, validation engine 114 may utilize the value specified by expiry timeout period value 136 as a predefined threshold value that is monitored by record expiry timer 116. In one embodiment, default expiry timeout period value 136 may be set to 21,600 seconds. Notably, record expiry timer 116 can be used by STP 106 to monitor the time at which ingress SS7 signaling messages are received from foreign networks that are servicing outbound roaming subscribers. STP 106 can utilize validation engine 114 and timer 116 to validate a VLR sending a location update request message that follows an SAI request message in instances where the subscriber is moving from one roaming network to another roaming network. Namely, validation engine 114 may be configured to ensure that an SAI request message and a subsequent location update request message originate from a same VLR within a predefined time period measured by record expiry timer 116. Because of the likelihood that a legitimate VLR would send the location update request and SAI request messages close in time, the disclosed method system thereby ensures these messages are sent from a single source in a timely manner affords a safeguard against potential roaming fraud by detecting the time difference and source(s) of the messages.

Figure 2:
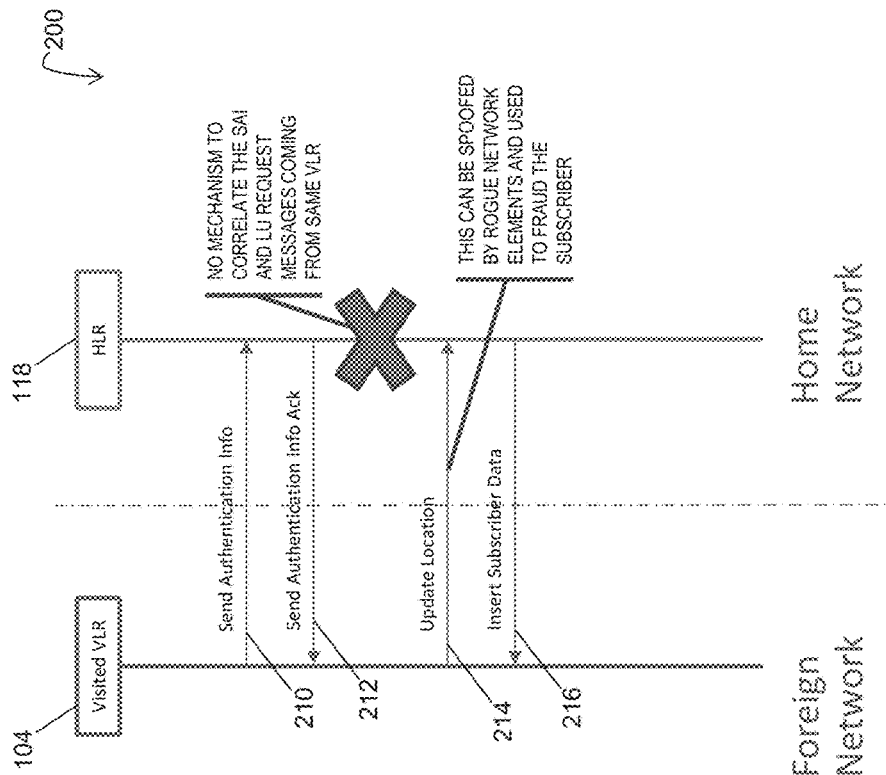
FIG. 2 is message flow diagram illustrating exemplary messages exchanged between network entities for an outbound roaming subscriber.

FIG. 2 depicts a message flow diagram illustrating exemplary SS7/MAP signaling messages that may be spoofed for purposes of conducting fraudulent roaming. In FIG. 2, a subscriber's user equipment (not shown) may be roaming outside its home network and is notably located within a visited network (i.e., the user equipment is without home network radio access). For example, the subscriber's user equipment may be registered and/or attached with a visited network VLR 104 (e.g., hosted by an MSC) that is configured to update a home network HLR 118 with the user equipment's current location information (e.g., current cell location). Prior to updating HLR 118 with the user equipment's current location, visited VLR 104 sends a MAP send authentication information request message 210 to HLR 118. The SAI request message 210 contains information that identifies the visited network VLR and the subscriber's user equipment (e.g., a mobile device). In response to receiving SAI request message 210, HLR 118 sends a MAP SAI acknowledgement message 212 to VLR 104.

After receiving the SAI acknowledgement message 212, visited VLR 104 sends a location update request message 214 to HLR 118 to update the current location of the subscriber's user equipment. In response to receiving and processing location update request message 214, HLR 118 sends a location update response message (e.g., Insert Subscriber Data message 216) to visited network VLR 104. Notably, the location update response message contains subscriber identification data that allows services to be provided to the subscriber user and allows charging according to the rules and/or policies of the visited network in which the subscriber user equipment is currently located.

In the event a user equipment device is roaming in a foreign network and location update request message 214 originates from a valid VLR, the signaling scenario depicted in FIG. 2 does not involve any fraudulent activity. However, a fraudulent system hosted by a spoofer can masquerade or act as visited network VLR 104 and send a spoofed location update request message to HLR 118 to update the location data stored for the subscriber user equipment to the spoofer's fraudulent network. The updating of the HLR with the subscriber user equipment's location information may allow the spoofer to intercept subsequent communications from the subscriber because the record entry stored in the HLR would point to the location of the spoofer network rather than the actual location of the subscriber user equipment (and/or host VLR).

In some instances, a spoofer masquerades as a real MSC and/or VLR in a spoofer network. Masquerading as a real MSC/VLR includes generating valid messages, such as MAP-based location update request messages and forwarding those messages to other networks in an attempt to obtain subscriber information from those networks. A spoofer may be a computing platform with the capability to communicate over a network and generate MAP location update messaging, such as SS7 location update messaging. If a spoofer can generate location update messaging and has access to a valid subscriber identifier, such as an international mobile station identifier (IMSI), a mobile subscriber integrated services digital network (MSISDN) number, and/or an international mobile equipment identifier (IMEI), then the spoofer can generate an attack using location update messaging to obtain subscription information for the identified subscriber from the mobile subscriber's HLR.

In some instances, a spoofer may be located in a spoofer network separate from the visited network and masquerades as an MSC/VLR. In FIG. 2, a spoofer could send a MAP location update request message 214 to HLR 118. SS7 based signaling attacks may be introduced through interconnect signaling traffic from roaming networks. Some examples of attacks include subscriber denial of service (DoS) attacks, location tracking attacks, and fraud attacks. These attacks may be performed by spoofing or impersonating the identity of foreign network elements. For example, identifiers for a serving visited location register (VLR) may be spoofed in incoming SS7 and/or MAP request messages, such as MAP SAI request messages and MAP location update request messages sent from a visited network VLR (and/or hosting MSC). Notably, the disclosed subject matter presents a system and method that utilizes an STP to validate/authenticate a foreign network VLR that is directing SS7 signaling traffic towards an HLR residing in a home network of a subscriber that is roaming in the visited network. Notably, the system depicted in FIG. 2 needs an effective mechanism to verify that both the SAI request message and the location update request message are received from the same visited VLR (e.g., VLR 104) and within a predefined time period.

In some embodiments, STP 106 may be configured to receive incoming messages from foreign networks and to perform screening and authentication processing for SS7 and/or MAP signaling messages that include VLR identification information. Notably, the STP can be configured to function as a gatekeeper for the home network by validating the identity of the VLR that is sending the SAI request messages and location update request messages to the home network. In some embodiments, the STP can also be configured to verify that the SAI request message and the location update request message are both sent from the same source (e.g., VLR and/or MSC) within a predefined time period. The STP can be configured to maintain a mapping (e.g., a database entry) of the subscriber user equipment's IMSI and the <VLR-ID, SAI flag, LU flag>information of the visited VLR in a validation database that is accessible by the STP. For example, the VLR validation database can be hosted locally on the STP or may be hosted by a network element (e.g., a second STP or an application server) that is accessible by the STP. Further, the VLR validation database is also accessible by the STP's mated pair (e.g., a second STP assigned/paired to the first STP). Although the use of an IMSI is described herein, any subscriber or device identifier can be used without departing from scope of disclosed subject matter. The VLR identifier (VLR-ID) is an identifier that identifies a VLR and/or a host MSC in the visited network. In particular, the VLR-ID is contained or included in both SAI request messages and location update request messages. In some embodiments, a validation engine can set an SAI flag when a SAI request message is received for a specific IMSI. Similarly, the location update request flag is set by a validation engine when a location update request message is received for the same IMSI. The VLR identifier notably identifies the visited network's VLR and/or MSC. This VLR identifier can be updated by the validation engine when the location update request message is received from the visited network VLR.

In some embodiments, the location update request message may be validated by the validation engine if the location update request message is received only after the successful authentication via SAI request messages that originate from the same VLR. In some embodiments, the validation engine may forward messages to the HLR or VLR after being validated (e.g., in the event the VLR identifier contained in the received request message matches a VLR identifier stored in the VLR validation database).

In some embodiments, STP 106 can be configured to maintain a record expiry timer 116 for the purposes of deleting records from the VLR validation database. For example, a default expiry timeout value for record deletion can be set to an operator defined value (e.g., 10,000 seconds). When the timer expires, the record may be deleted from the VLR validation database.

Figure 3A:
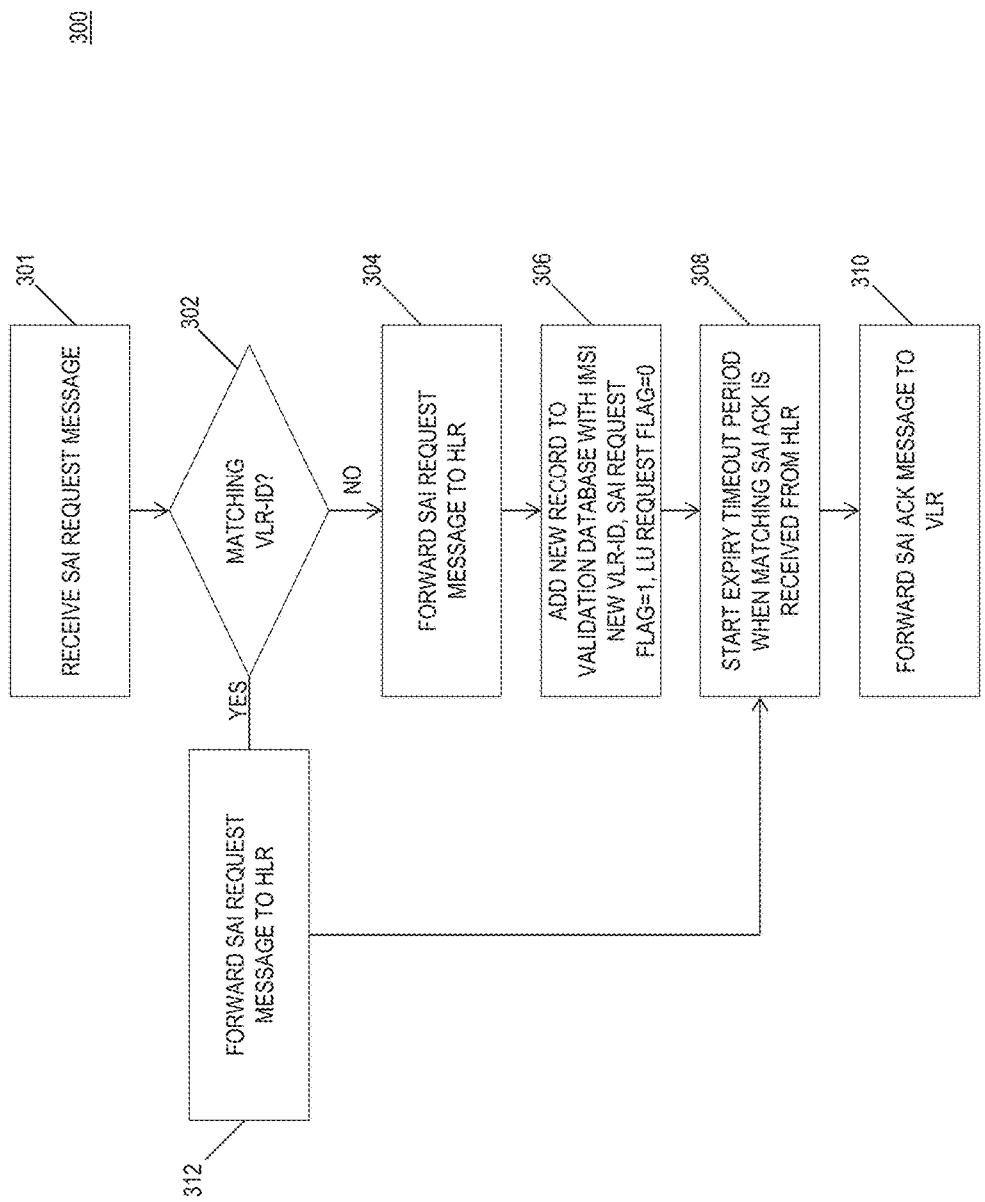
FIG. 3A is a flow chart illustrating an exemplary process performed by an SS7 STP in processing a MAP SAI request message for VLR validation to reduce fraud in location update transactions.

FIGS. 3A-3D illustrate exemplary methods for processing messages relating to outbound roaming subscribers and protecting against roaming related fraud. For example, FIG. 3A illustrates an exemplary process (method 300) performed for SAI request messages and SAI acknowledgement messages that are received by an STP in the event a matching IMSI is stored in a validation database that is accessible by the STP. In some embodiments, method 300 depicted in FIG. 3 is an algorithm stored in memory that when executed by a hardware processor performs steps 301-310. In block 301 of FIG. 3A, a SAI request message sent by a visited network VLR is received by an STP. In block 302, a determination is made as to whether the SAI request message includes a matching VLR identifier. This step may be performed by validation engine 114 using validation database 132. The determination of whether a matching VLR identifier exists in validation database 132 can include the extracting of an IMSI from the SAI request message. More specifically, validation engine 114 can extract a VLR identifier from the SAI request message and compare the extracted VLR identifier to the VLR identifier stored (if any) in validation database 132. In the event that the VLR identifier in the database record entry does not match the identifier originally included in the received SAI request message, method 300 proceeds to block 304 where the request message is forwarded to the HLR in the subscriber's home network. If a matching VLR identifier is not found, the method proceeds to block 312 where the SAI request message is forwarded to the HLR (and method 300 proceeds to block 308 as described below).

In block 306, new database record entry is generated and added to validation database 132. The new database record entry in validation database 132 may contain, for the previously stored IMSI, i) a new VLR identifier extracted from the SAI request message, ii) a SAI flag set to '1' which indicates that the SAI request message has been received, and iii) a LU request flag set to '0' which indicates that a location update request message for the particular VLR identifier has not yet been received.

In block 308, a record expiry timeout period is initiated when a matching SAI acknowledgement message is received by the STP from the HLR. The SAI acknowledgement message serves as an indication that the request message was successfully received and processed by the HLR.

In block 310, the SAI acknowledgement message is forwarded to the VLR (and/or MSC) that sent the original SAI request message.

Figure 3B:
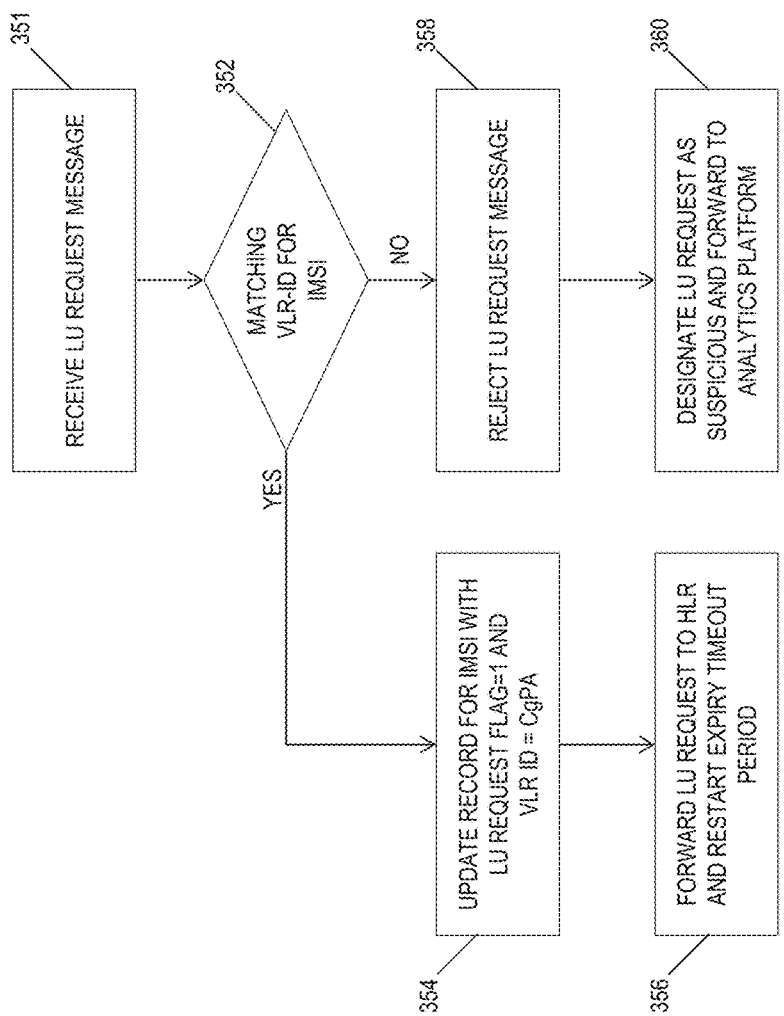
FIG. 3B is a flow chart illustrating an exemplary process performed by an SS7 STP in processing a MAP location update request message with a matching IMSI for VLR validation to reduce fraud in location update transactions.

FIG. 3B illustrates an exemplary method 350 which includes steps conducted by validation engine 114 for processing a location update request message when the update location request message contains an IMSI that is presently stored in validation database 132. In block 351, a MAP location update request message is received. The location update request message may originate from a legitimate VLR in a visited network where are subscriber is roaming. Alternatively, the location update request message may originate from a spoofer and/or attacker. In block 352, a determination is made whether a VLR identifier extracted from the location update request message matches a VLR identifier that is stored for the IMSI in the validation database 132. For example, this determination in (block 352) can be performed by validation engine 114 using validation database 132. If a VLR identifier extracted from a location update request message matches the VLR identifier included in the database record entry stored in validation database 132, method 350 proceeds to block 354 where a database record entry for the IMSI is updated to i) set the LU request flag equal to (which indicates the receipt of a location update request message) and ii) set the VLR identifier to the calling party address (CgPA) parameter (e.g., a signaling client control protocol (SCCP) CgPA) received in the location update request message. Method 350 then proceeds to block 356 where the location update request message is forwarded to the HLR and the timer keeping track of the record expiry timeout period for the record is reset and/or restarted.

Returning to block 352, if the VLR identifier in the location update request message does not match any of the VLR identifiers stored in validation database 132 for the IMSI, the message is flagged as potentially originating from an attacker and/or spoofer entity. Method 350 proceeds to block 358 where the location update request message is rejected by the validation engine 114. Notably, the rejected location update request message is prevented from being forwarded to the HLR in the subscriber's home network. In block 360, the rejected location update request message is marked by the validation engine as a suspicious message and is forwarded to an analytics platform. The analytics platform can be configured to provide a warning notification to the network operator and/or perform or trigger other actions associated with fraud detection and prevention.

Figure 3C:
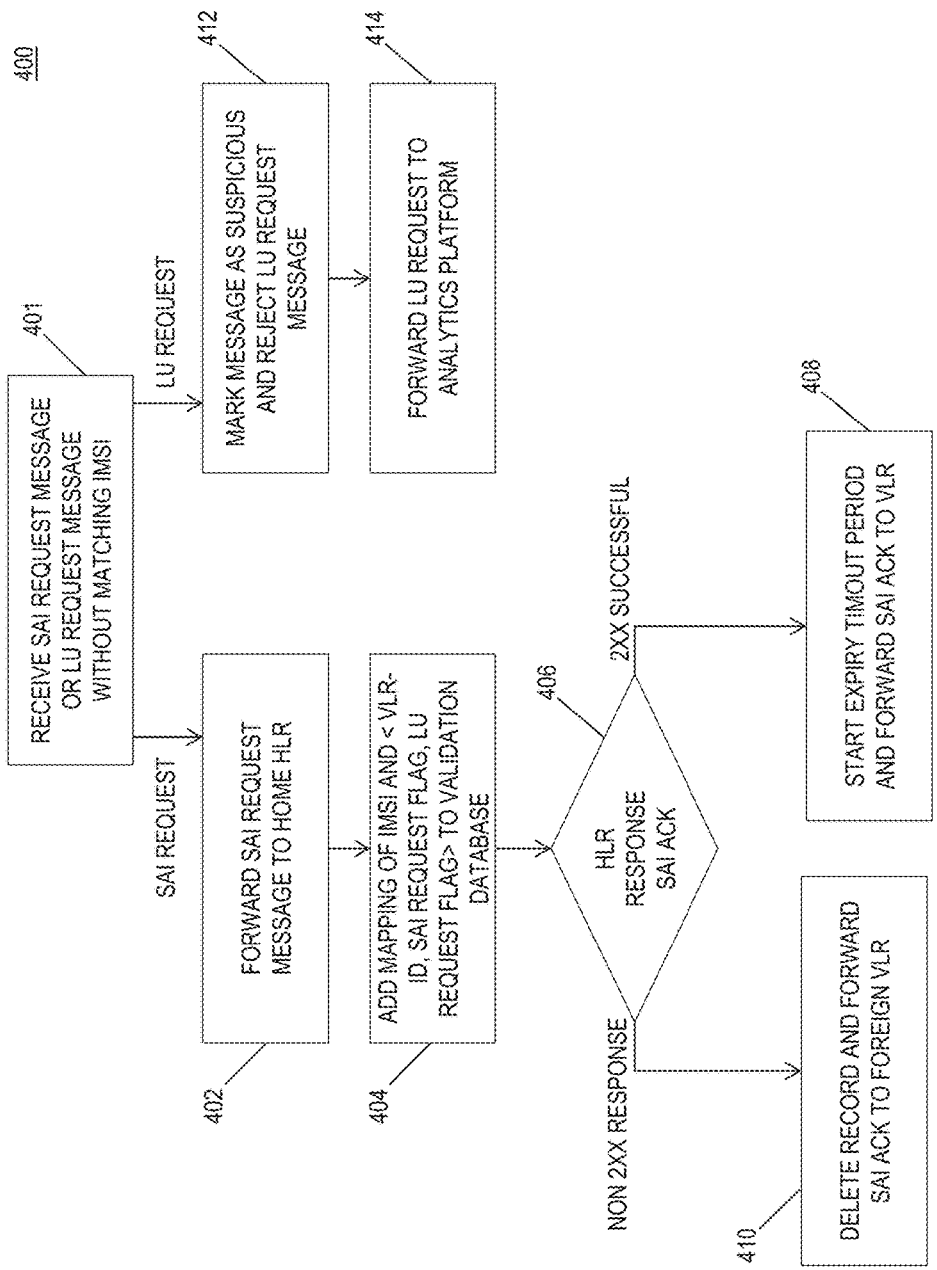
FIG. 3C is a flow chart illustrating an exemplary process performed by an SS7 STP in processing a MAP SAI request or location update request message without a matching IMSI for VLR validation to reduce fraud and location update transactions.

FIG. 3C illustrates an exemplary method 400 that includes steps that are performed by a validation engine in processing a received SAI request message or a location update request message that does not correspond to a matching IMSI (i.e., there is no database record entry for the IMSI presently stored in validation database 132). In block 401, a SAI request message or a location update request message without a matching IMSI is received. For example, validation engine 114 may determine whether the received request message includes a matching IMSI by extracting the IMSI from the received request message and performing a lookup query in validation database 132 using the extracted IMSI. If there is no database record entry containing the matching IMSI stored in the database 132, then the processing illustrated in FIG. 3C will be conducted.

In the event the received request message is a SAI request message, then method 400 proceeds to block 402 where the SAI request message is forwarded to the HLR in the home network. In block 404, a database record entry mapping the IMSI (extracted from the SAI request message) to the VLR identifier (and including a SAI flag and a LU request flag) is added to validation database 132.

In block 406, the HLR responds with a SAI acknowledgement message. If the response message indicates that the SAI request was successfully received and processed by the HLR, then method 400 proceeds to block 408 where the record expiry timeout period (e.g., via timer 116) is initiated by the validation engine. The validation engine may also forward the SAI acknowledgement message to the VLR (and/or MSC) in the foreign/visited network. If the response indicates that the SAI request was not successfully received, method 400 continues to block 410 where the record entry is deleted from validation database 132, and the acknowledgement message is forwarded to the foreign VLR (and/MSC).

Returning to block 401, if the received request message is a location update request message and there is no matching IMSI in the validation database, the method continues to block 412 where the request message is marked as being suspicious. Notably, this suspicious message is rejected and prevented by the validation engine from being forwarded to the HLR in the subscriber's home network.

Figure 3D:
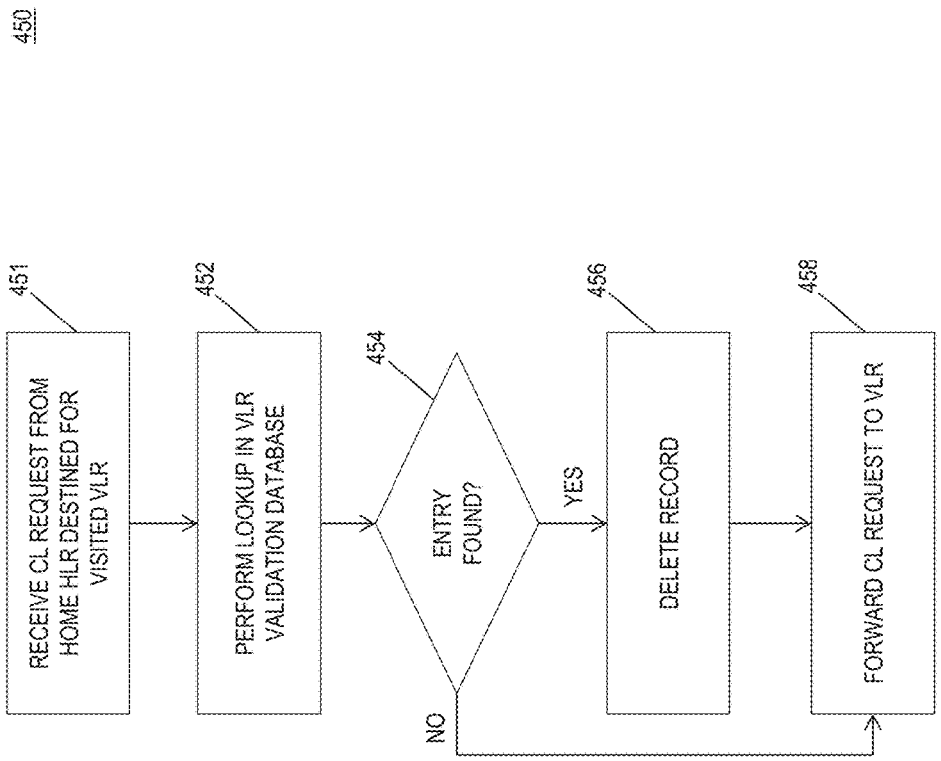
FIG. 3D is a flow chart illustrating an exemplary process performed by an SS7 STP in processing a cancel location request (CLR) message for VLR validation to reduce fraud in location update transactions.

FIG. 3D illustrates an exemplary method 450 that may be executed by the validation engine 114 when a cancel location request message is received by the STP from the HLR in the home network. In block 451, a cancel location request message is received by the STP from the HLR in the subscriber's home network. Notably, the cancel location request message may be directed to a visited VLR (and/or MSC) where the subscriber's user equipment was previously registered.

In block 452, a lookup query is performed in validation database 132. In some embodiments, the validation engine may perform the lookup query by using the IMSI contained in the cancel location request message and comparing the destination host identifier with VLR identifiers recorded for authenticated location update request messages.

In block 454, a determination is made by the validation engine as to whether a database record entry is found in VLR validation database 132 which the IMSI included in the cancel location request message matches the IMSI of the record. If a matching entry is not found in validation database 132, then method 450 proceeds to block 458 where they cancel location request message is forwarded by the validation engine to the VLR (and/or MSC) in the visited network. Conversely, if a match is found in block 454, then method 450 continues to block 456 and the database record entry corresponding to the cancel location request message is deleted by the validation engine. Afterwards, the method proceeds to block 458 where the cancel location request message is forwarded to the VLR (and/or MSC) in the visited network.

Figure 4:
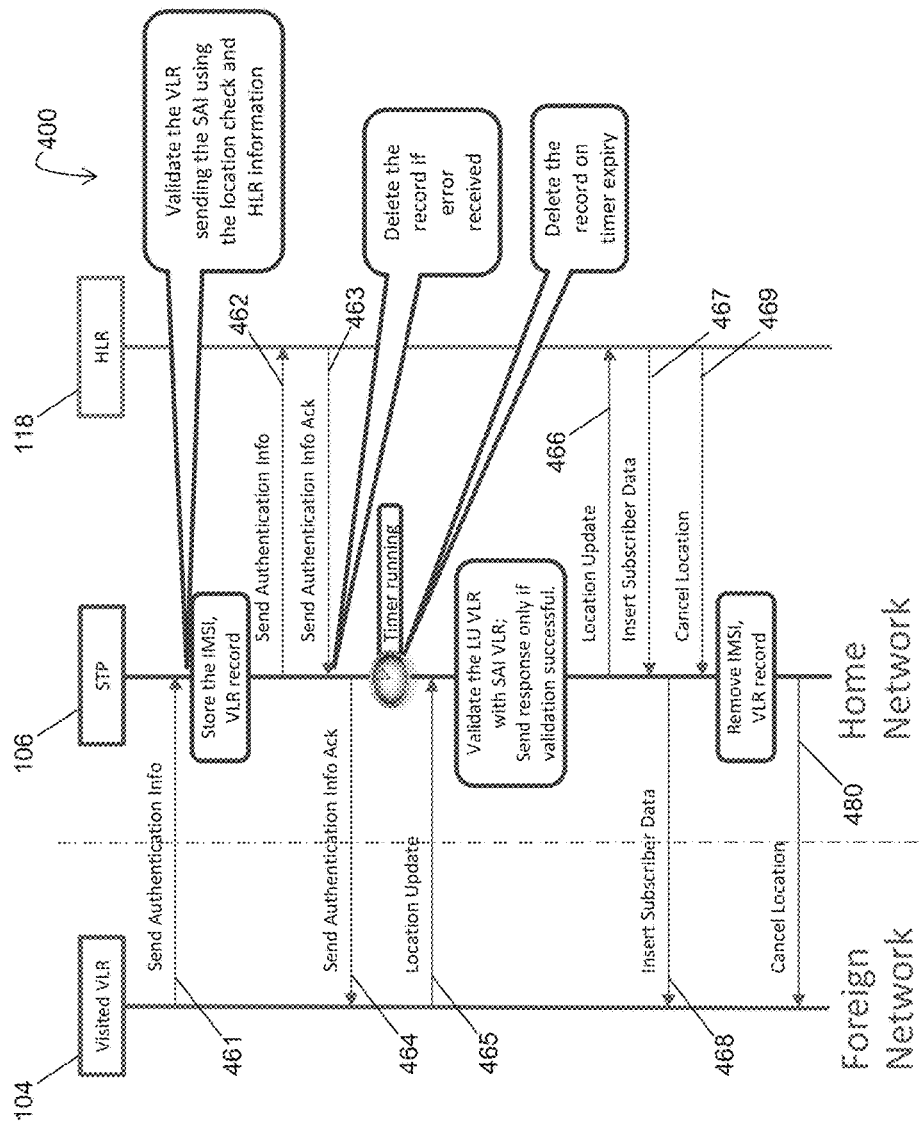
FIG. 4 is a message flow diagram illustrating exemplary messaging for VLR validation to reduce fraud in update location transactions.

FIG. 4 illustrates a signaling flow diagram that illustrates exemplary messages that are exchanged with STP 106 for the purposes of identifying and processing signaling messages that are related to roaming subscribers. Referring to FIG. 4, a visited VLR 104 directs a MAP SAI request message 461 to STP 106. The SAI request message 461 may be generated by a legitimate VLR and/or MSC in response to the attachment of a subscriber's UE to the network.

Alternatively, request message 461 may comprise a fraudulent message that is generated by a spoofer masquerading as a valid VLR or MSC. STP 106 can validate the VLR sending message 461 by using a location check and HLR information (which must be obtained) for example, after receiving SAI request message 461, STP 106 is configured to obtain the IMSI and VLR identifier (originally contained in request message 461) and subsequently records this information in a mapping database (e.g., validation database 132 in FIG. 1) that is accessible to STP 106. After storing the IMSI and VLR identifier information, STP 106 forwards the request message (e.g., shown as SAI request message 462) to HLR 118.

In response to receiving request message 462, HLR 118 is configured to generate SAI acknowledgement message 463. If the acknowledgement message 463 indicates that the SAI request message 462 was not received (i.e., unsuccessful transaction), then the stored database record entry that was created is deleted. Alternatively, if acknowledgement message 463 indicates that SAI request message 462 was received successfully, the database record entry is maintained in the validation database. Afterwards, the acknowledgement message is forwarded (as SAI acknowledgement message 464) to VLR 104. In addition, after sending a successful SAI acknowledgement message 464, STP 106 initiates the expiry timeout period (via a timer mechanism) for the record entry.

In some embodiments, visited VLR 104 is configured to send a location update request message 465 to STP 106. After receiving message 465, STP 106 validates the VLR identifier corresponding to the sender of the location update request message 465 with the VLR identifier corresponding to the sender of SAI request message 461. If the validation is successful (i.e., the VLR identifiers are the same and match each other) and message 465 was received within a predetermined time period threshold (e.g., expiry timeout period) monitored by the expiry timer, then the location update request message is forwarded to HLR 118 (as location update request message 466). If the validation is not successful for any reason, the location update request message is not forwarded to HLR 118 and may instead be directed to an analytics platform for fraud processing.

In the event a location update request message is determined to be valid, the location update request message 465 is forwarded to HLR 118. In response to receiving a valid location update request message 466, HLR 118 sends an Insert Subscriber Data message 467 to STP 106. STP 106 then directs Insert Subscriber Data message 467 to visited VLR 104 (shown as Insert Subscriber Data message 468).

HLR 118 can also be configured to subsequently send a cancel location request message 469 to STP 106. In response to receiving the cancel location request message 469, STP 106 can remove the database record entry that contains the IMSI and VLR ID information from validation database 132. After the database record entry is removed, STP 106 may forward the cancel location request message (shown as cancel location request message 480) to visited VLR 104.

Advantages of the subject matter described herein include the ability to be deployed and operational at an SS7 STP. Notably, the fraud detection methods described herein can be deployed by a mobile network operator as well as an interconnect operator. An interconnect operator can add and perform the VLR authentication processing described herein on behalf of all mobile network operators communicatively connected to the interconnect operator. Thus, an interconnect operator utilizing the subject matter described herein can correlate SAI request messages and MAP based location update request messages for a plurality of mobile network operators and to protect the HLR of each mobile network operators.

An additional advantage of deploying the subject matter described herein at an STP, rather than an SS7 end node (e.g., an HLR or VLR), is that messaging between the STP and the HLR may be reduced. For example, if authentication of a location update request message is performed by the HLR, authentication messaging between the STP and the HLR may be required for each location update request message received prior to determining whether the location update request message can be forwarded to the HLR. Such additional authentication messaging can result in unnecessary traffic in an operator's network. The subject matter described herein avoids such additional messaging by conducting the VLR authentication at the STP using an authentication database that is accessible to the STP.

An STP that is configured to perform VLR authentication as described herein improves the technological field of computer network security by reducing the likelihood of fraud and other types of signaling attacks that can compromise computer networks. In addition, the subject matter described here and improves the area of communications network efficiency by reducing the amount of signaling required to perform VLR authentication by caching information from SAI request messages at an STP. Thus, the need for signaling back and forth between the STP and the HLR for authentication is reduced.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for validating a visitor location register (VLR) using a signaling system no. 7 (SS7) signal transfer point (STP), the method comprising:
   maintaining a VLR validation database accessible by an SS7 STP;
   receiving, by the STP, a mobile application part (MAP) send authentication information (SAI) request message;
   determining, by the STP, that the MAP SAI request message includes a VLR identifier not recorded in the VLR validation database accessible by the STP;
   recording the VLR identifier in the VLR validation database accessible by the STP;
   receiving, at the STP, a first MAP location update (LU) request message and detecting a VLR identifier in the first MAP LU request message;
   determining that the VLR identifier read from the first MAP LU request message does not match the VLR identifier recorded for a subscriber in the VLR validation database accessible by the STP; and
   in response to determining that the VLR identifier does not match the VLR identifier recorded for the subscriber in the VLR validation database accessible by the STP, rejecting the first MAP LU request message.

2. The method of claim 1 wherein the VLR Validation database is also accessible by a second SS7 STP that functions as a mate to the SS7 STP.

3. The method of claim 1 wherein receiving the MAP SAI request message includes receiving the MAP SAI request message with an international mobile subscriber identity (IMSI) that is not recorded in the VLR validation database accessible by the STP and wherein recording the VLR identifier from the SAI request message in the VLR validation database accessible by the STP includes creating a new record in the VLR validation database accessible by the STP for the IMSI and the VLR identifier.

4. The method of claim 1 wherein receiving a MAP SAI request message includes receiving a MAP SAI request message including an international mobile subscriber identity (IMSI) that is recorded in the VLR validation database accessible by the STP and wherein recording the VLR identifier from the SAI request message in the VLR validation database accessible by the STP includes creating, in the VLR validation database accessible by the STP, a record corresponding to the IMSI and storing the VLR identifier from the MAP SAI request message in the record.

5. The method of claim 1 comprising:
   forwarding the SAI request message to a home location register (HLR);
   receiving a SAI acknowledgement message with a successful result code from the HLR; and
   starting a record expiry timer in response to receiving the SAI acknowledgement message from the HLR.

6. The method of claim 5 comprising, in response to the record expiry timer reaching an expiration value, deleting the record from the VLR validation database accessible by the STP.

7. The method of claim 1 comprising receiving a second MAP LU request message including a VLR identifier that matches the VLR identifier recorded for the subscriber in the VLR validation database.

8. The method of claim 7 comprising forwarding the second MAP LU request message to a home location register (HLR).

9. The method of claim 8 comprising updating a record entry in the VLR validation database accessible by the STP to indicate receipt of the second MAP LU request message and storing, in the record, a calling party address (CgPA) parameter from the second MAP LU request message as an VLR identifier.

10. The method of claim 1 comprising, in response to determining that the VLR identifier in the first LU request message does not match the VLR identifier recorded for the subscriber in the VLR validation database, designating the first LU request message as suspicious.

11. A system for validating a visitor location register (VLR) using a signaling system no. 7 (SS7) signal transfer point (STP), the system comprising:
   a signaling system no. 7 (SS7) signal transfer point (STP) including at least one processor;
   a visitor location register (VLR) validation database local to the STP for storing records for authenticating a plurality of VLRs; and
   an validation engine local to the STP and implemented using the at least one processor for receiving a mobile application part (MAP) send authentication information (SAI) request message, determining that the MAP SAI request message includes a VLR identifier not recorded, recording the VLR identifier in the VLR validation database accessible by the STP, receiving a first MAP location update (LU) request message and detecting a VLR identifier in the first MAP LU request message, determining that the VLR identifier read from the first MAP LU request message does not match the VLR identifier recorded for a subscriber in the VLR validation database accessible by the STP, and, in response to determining that the VLR identifier does not match the VLR identifier recorded for the subscriber in the VLR validation database accessible by the STP, rejecting the first MAP LU request message.

12. The system of claim 11 wherein the VLR validation database is also accessible by a second SS7 STP that functions as a mate to the SS7 STP.

13. The system of claim 11 wherein the validation engine is configured to receive the MAP SAI request message with an international mobile subscriber identity (IMSI) that is not recorded in the VLR validation database accessible by the STP and to create a new record in the VLR validation database accessible by the STP for the IMSI and the VLR identifier.

14. The system of claim 11 wherein the validation engine is configured to receive the MAP SAI request message including an international mobile subscriber identity (IMSI) that is recorded in the VLR validation database accessible by the STP and to create, in the VLR validation database accessible by the STP, a record corresponding to the IMSI and to store the VLR identifier from the MAP SAI request message in the record.

15. The system of claim 11 wherein the validation engine is configured to:
   forward the SAI request message to a home location register (HLR);
   receive a MAP SAI acknowledgement message with a successful result code from the HLR; and
   start a record expiry timer in response to receiving the SAI acknowledgement from the HLR.

16. The system of claim 15 wherein the validation engine is configured to, in response to the record expiry timer reaching an expiration value, delete the record from the validation database accessible by the STP.

17. The system of claim 11 wherein the validation engine is configured to receive a second MAP LU request message including a VLR identifier that matches the VLR identifier recorded for the subscriber and to forward the second MAP LU request message to a home location register (HLR).

18. The system of claim 17 wherein the validation engine is configured to update the record in the VLR validation database accessible by the STP to indicate receipt of the second MAP LU request message and to store, in the record, a calling party address (CgPA) parameter from the second MAP LU request message as an VLR identifier.

19. The system of claim 11 wherein the validation engine is configured to, in response to determining that the VLR identifier in the first LU request message does not match the VLR identifier recorded, designating the first LU request message as suspicious.

20. A non-transitory computer readable medium having stored thereon executable instructions that when executed by a processor of a computer controls the computer to perform steps comprising:
   maintaining a visitor location register (VLR) validation database accessible by a signaling system no. 7 (SS7) signal transfer point (STP);
   receiving, by the STP, a mobile application part (MAP) send authentication information (SAI) request message;
   determining, by the STP, that the MAP SAI request message includes a VLR identifier not recorded in the VLR validation database accessible by the STP;
   recording the VLR identifier in the VLR validation database accessible by the STP;
   receiving, at the STP, a first MAP location update (LU) request message and detecting a VLR identifier in the first MAP LU request message;
   determining that the VLR identifier read from the first MAP LU request message does not match the VLR identifier recorded for a subscriber in the VLR validation database accessible by the STP; and in response to determining that the VLR identifier does not match the VLR identifier recorded for the subscriber in the VLR validation database accessible by the STP, rejecting the first MAP LU request message.

\* \* \* \* \*